US006556743B2

United States Patent
Kim et al.

(12) United States Patent
(10) Patent No.: US 6,556,743 B2
(45) Date of Patent: Apr. 29, 2003

(54) OPTICAL SIGNAL ADD AND DROP APPARATUS

(75) Inventors: Myoung Jin Kim, Kyunggi-do (KR); Young Min Im, Kyunggi-do (KR)

(73) Assignee: Korea Electronics Technology Institute (KR)

( * ) Notice: Subject to any disclaimer, the term of this patent is extended or adjusted under 35 U.S.C. 154(b) by 85 days.

(21) Appl. No.: 09/842,096

(22) Filed: Apr. 26, 2001

(65) Prior Publication Data

US 2001/0038734 A1 Nov. 8, 2001

(30) Foreign Application Priority Data

Apr. 29, 2000 (KR) ........................................ 2000-23087

(51) Int. Cl.[7] ............................................... G02B 6/28
(52) U.S. Cl. .......................................... 385/24; 385/34
(58) Field of Search ............................. 385/21, 34, 24, 385/31

(56) References Cited

U.S. PATENT DOCUMENTS

| 5,566,014 A | 10/1996 | Glance ....................... 359/124 |
| 5,629,995 A | 5/1997 | Duck et al. .................... 385/24 |
| 5,930,016 A | 7/1999 | Brorson et al. .............. 359/127 |
| 6,154,585 A | 11/2000 | Copner et al. ................ 385/16 |
| 6,249,625 B1 * | 6/2001 | Pan .............................. 385/24 |
| 6,396,980 B1 * | 5/2002 | Liu et al. .................... 359/124 |

OTHER PUBLICATIONS

Application Note, "Configurable Add/Drop Multiplexing", JDS Uniphase Corporation, (Jun. 2000).

* cited by examiner

Primary Examiner—Hung N. Ngo
(74) Attorney, Agent, or Firm—Roylance, Abrams, Berdo & Goodman, L.L.P.

(57) ABSTRACT

The present invention provides an optical signal add/drop apparatus comprising: an optical signal multiplexing/demultiplexing portion comprising a plurality of 2×2 channel unit devices which are arranged in a straight line and having first and second dual-core ferrules having two optical fibers disposed to be symmetrical to each other at an identical distance from an optical axis for transmitting optical signals, a wavelength division filter disposed between first and second lenses for selectively transmitting or reflecting only the optical signals having specific wavelengths, first and second grin lenses for collimating or focusing the optical signal transmitted or reflected from said wavelength division filter and then transmitting the signal to the first and second dual-core optical fibers; and a switch module having unit 2×2 switches connected to two optical fibers of the second dual-core ferrule of each of the unit devices of said optical signal multiplexing/demultiplexing portion; wherein the switch module can drop simultaneously the optical signals demultiplexed on each of the unit devices or transmit them to the output channels continuously according to the connection state of each of 2×2 switches of the switch modules and then transmit them to output channels through each of the unit devices when the optical signals are added.

5 Claims, 5 Drawing Sheets

OPTICAL SIGNAL ADD AND DROP APPARATUS

FIELD OF INVENTION

The present invention relates to an optical signal add/drop apparatus, and more particularly, to an optical signal add/drop apparatus capable of adding and dropping simultaneously optical signals having various wavelength bands.

The optical signal add/drop apparatus is generally used for the optical signal transmission from a major optical transmission line of a bi-directional optical transmission system to a local network or metro core network, or for the optical signal transmission from a metro core network to a access network. That is, by using this optical signal add/drop apparatus, some optical signals having several specific wavelengths, among the optical signals that are transmitted through an optical transmission system from a region A (source) to a region B (destination), can be dropped from a region C and can be used in the network of the region C, and signals having the same wavelength as the dropped signals can be added and can be transmitted to B region.

Particularly, when optical signals having various wavelengths have been inputted into the optical signal add/drop apparatus used in a wavelength division multiplexing optical transmission system, the apparatus can simultaneously add a plurality of desired optical signals thereto and drop the desired optical signals therefrom.

BACKGROUND OF INVENTION

FIG. 1 shows the constitution of a conventional optical signal add/drop apparatus that can simultaneously add and drop a plurality of optical signals.

As shown in FIG. 1, the conventional optical signal add/drop apparatus comprises a demultiplexer 10, a multiplexer 20 and a switch module 30.

The demultiplexer 10 divides multi-band optical signals $\lambda_1$ to $\lambda_n$ inputted through optical fibers (input channels) into optical signals having respective wavelength bands, and transmits the divided signals through n optical fibers of output channel. The multiplexer 20 multiplexes optical signals having different wavelength bands inputted through the n optical fibers, respectively; and transmits the multiplexed optical signals to the destination through the other optical fibers (output channels). The demultiplexer 10 and the multiplexer 20 using thin film technology comprise a plurality of optical unit devices (not shown) for combining and separating the optical signals.

The switch module 30 comprises n set of 2×2 switches for connecting respective optical signals received from the demultiplexer 10 with either of the optical fibers connected to the multiplexer 20 or the optical fibers connected to a local network 40.

In the optical signal add/drop apparatus constructed as such, multiple optical signals $\lambda_1$ to $\lambda_n$ having n different wavelengths, inputted through the input channels, are separated in view of their wavelengths by the demultiplexer 10 and are transmitted through the respective optical fibers. According to connection state of 2×2 switch, the optical signal may be dropped to the local network 40 or transmitted to the multiplexer 20. The optical signals may be inputted to the multiplexer 20, combined with the other signals having different wavelengths, and transmitted to the output channels.

However, since the conventional optical signal add/drop apparatus comprises a plurality of optical unit devices including the multiplexer, the demultiplexer and a group of the 2×2 switches, there was a problem in that the size of the apparatus becomes larger. Further, since the expensive elements such as multiplexer, demultiplexer and the group of the 2×2 switches should be used, there was another problem in that high costs of manufacture thereof are consumed.

Furthermore, since n optical unit devices should be provided, respectively, to the optical fiber grating typed or micro optics typed multiplexer and demultiplexer in case that there are n optical signals having different wavelengths, total 2n optical unit devices are used. Thus, the whole size of the apparatus becomes larger and the production costs thereof are more increased.

SUMMARY OF INVENTION

Accordingly, it is an object of the present invention to provide an optical signal add/drop apparatus that is small in size and is low in production cost.

Further, it is another object of the present invention to provide an optical signal add/drop apparatus wherein a plurality of wavelengths can be simultaneously dropped and added by multiplexing/demultiplexing portion, including a plurality of optical unit devices for simultaneously performing multiplexing and demultiplexing functions.

The optical signal add/drop apparatus for achieving the objects according to the present invention comprises: a first dual-core ferrule having first and second optical fibers disposed to be symmetrical to each other at identical distances from an optical axis for transmitting at least one optical signal; a second dual-core ferrule having third and fourth optical fibers disposed to be symmetrical to each other at identical distances from the optical axis for transmitting at least one optical signal; a wavelength division thin film filter for selectively transmitting only an optical signal having a specific wavelength; a first lens for collimating the optical signal inputted thereto from one of the optical fibers of the first dual-core ferrule into a parallel ray and outputting the parallel ray to the wavelength division thin film filter, and for focusing the optical signal reflected thereto from the wavelength division thin film filter and outputting the optical signal to the other optical fiber of the first dual-core ferrule; and a second lens for focusing the optical signal transmitted thereto from the wavelength division thin film filter and outputting the optical signal to one of the optical fibers of the second dual-core ferrule, and for collimating the optical signal inputted thereto from the other optical fiber of the second dual-core ferrule into a parallel ray, collimating the parallel ray to the wavelength division thin film filter, and outputting optical signal to the second fiber through first lens. Further, the first lens, the wavelength division thin film filter, and the second lens are arranged on the optical axis.

Multiplexing/demultiplexing portion including a plurality of optical unit devices and a switch module including a plurality of 2×2 switches, connected correspondingly to the optical unit devices, respectively, for dropping the optical signal outputted from the optical unit device or adding the optical signal, identical to that dropped from the optical unit device, to the optical unit device.

The optical signal add/drop apparatus according to another aspect of the present invention comprises: an optical signal combining and separating portion including a plurality of optical unit devices which have a first dual-core ferrule having first and second optical fibers disposed to be symmetrical to each other at identical distances from an optical axis for transmitting optical signals, a second dual-core ferrule having third and fourth optical fibers disposed to be symmetrical to each other at identical distances from the optical axis for transmitting optical signals, a wavelength division thin film filter for selectively transmitting only an optical signal having a specific wavelength, a first lens for collimating the optical signal inputted thereto from one of the optical fibers of the first dual-core ferrule into a parallel ray and outputting the parallel ray to a first surface of the wavelength division thin film filter and for focusing the optical signal inputted thereto from the wavelength division thin film filter and outputting the optical signal to the other optical fiber of the first dual-core ferrule, and a second lens for focusing the optical signal inputted thereto from the wavelength division thin film filter and outputting the optical signal to one of the optical fibers of the second dual-core ferrule and for collimating the optical signal inputted thereto from the other optical fiber of the second dual-core ferrule into a parallel ray and outputting the parallel ray to a second surface of the wavelength division thin film filter; and a switch module including a plurality of switches connected correspondingly to the optical unit devices, respectively, for dropping the optical signal outputted from the optical devices or adding the optical signal, identical to that dropped from the optical devices, to the optical devices.

Herein, it is preferred that the switches be connected to the third and fourth optical fibers of the second ferrule, thereby being constructed in the form of the 2×2 switches for dropping the optical signals outputted from the optical unit devices or adding the optical signals identical to the dropped optical signals.

Further, the first lens collimates the optical signal inputted through the first optical fiber into a parallel ray and outputs it to the wavelength division thin film filter. The first lens also focuses the optical signal, which is reflected by or passes through the wavelength division thin film filter, and outputs to the second optical fiber. The second lens collimates the optical signal inputted through the third optical fiber into a parallel ray and outputs it to the wavelength division thin film filter. Further, the second lens can focus the optical signal transmitted thereto from the wavelength division thin film filter and can output it to the fourth optical fiber.

Herein, the third optical fiber can be an add channel to which new optical signal is added from the local network, and the fourth optical fiber can be an drop channel through which the optical signal is dropped to the local network.

DETAILED DESCRIPTION FOR PREFERRED EMBODIMENT

Hereinafter, preferred embodiments of the present invention will be explained in detail with reference to the accompanying drawings.

Figure 1:
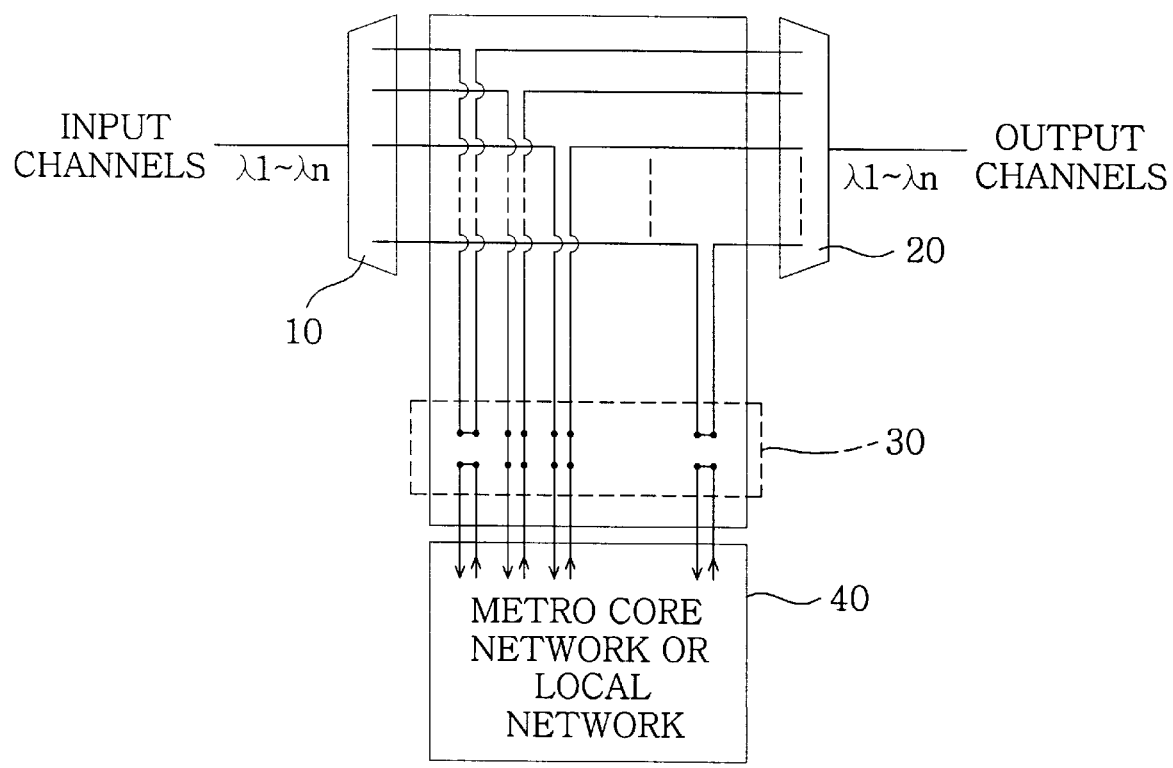
FIG. 1 is a view showing a conventional optical signal add/drop apparatus.
Figure 2:
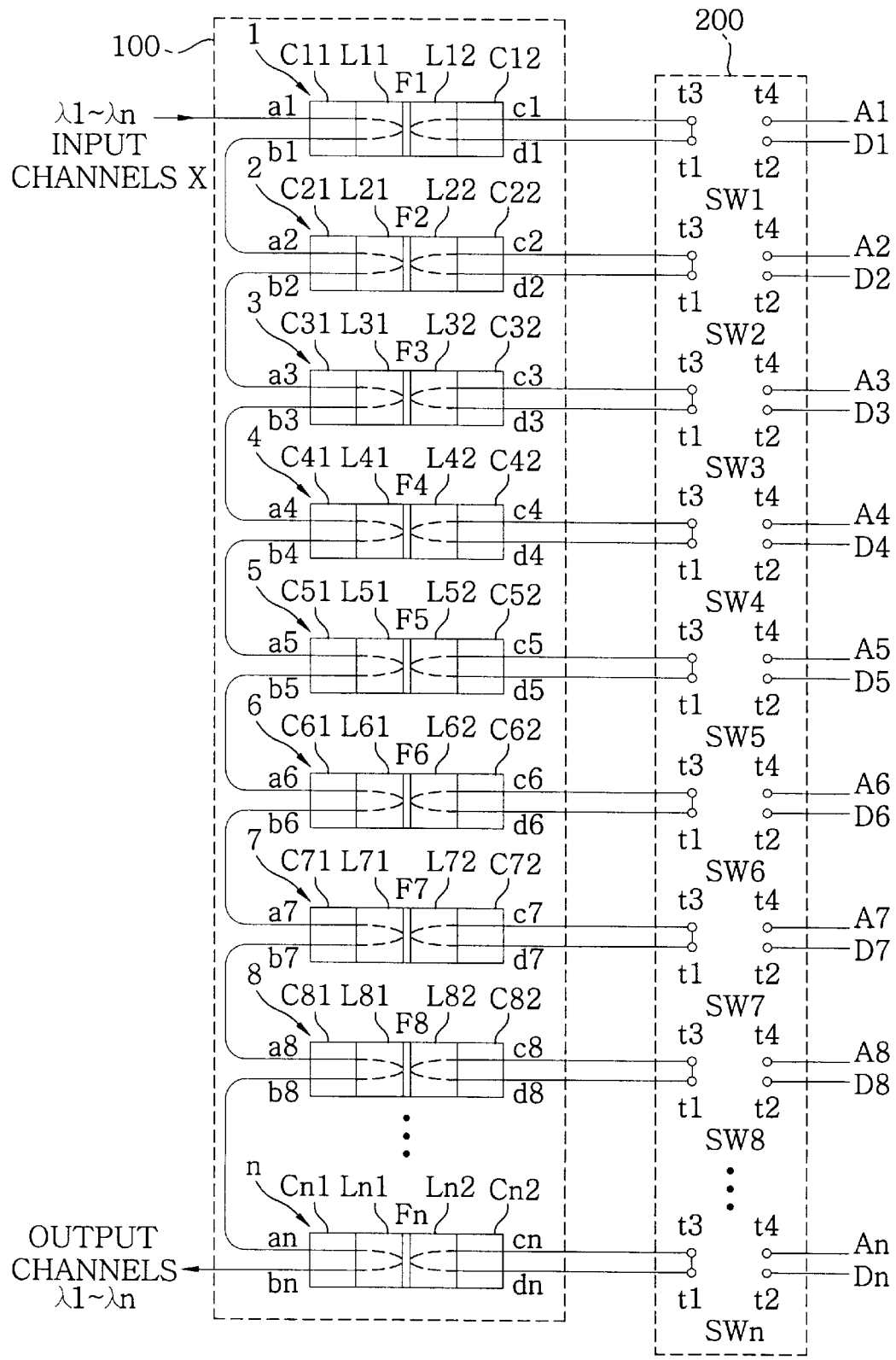
FIG. 2 is a view showing an optical signal add/drop apparatus according to an embodiment of the present invention.

FIG. 2 shows the constitution of an optical signal add/drop apparatus according to an embodiment of the present invention.

As shown in FIG. 2, the optical signal add/drop apparatus according to the present invention comprises an optical signal multiplexing and demultiplexing portion 100 and a switch module 200.

The optical signal multiplexing and demultiplexing portion 100 separates optical signals having different wavelengths into optical signals having respective wavelength bands, and then drops and adds required specific optical signals according to connection state of the switch module 200. Other optical signals which are not added is transmitted to an output channel. Further, the optical signal multiplexing and demultiplexing portion 100 combines optical signal to be added with the optical signals having different wavelengths that are continuously transmitted to the output channel, and then transmits the combined optical signals to the output channel. The optical signal multiplexing and demultiplexing portion 100 comprises a plurality of optical unit devices 1 to n for performing these functions. The number of the optical unit devices to be used for the above purpose can be varied in accordance with the number of the channels for the wavelengths of the optical signals to be transmitted.

Figure 3A:
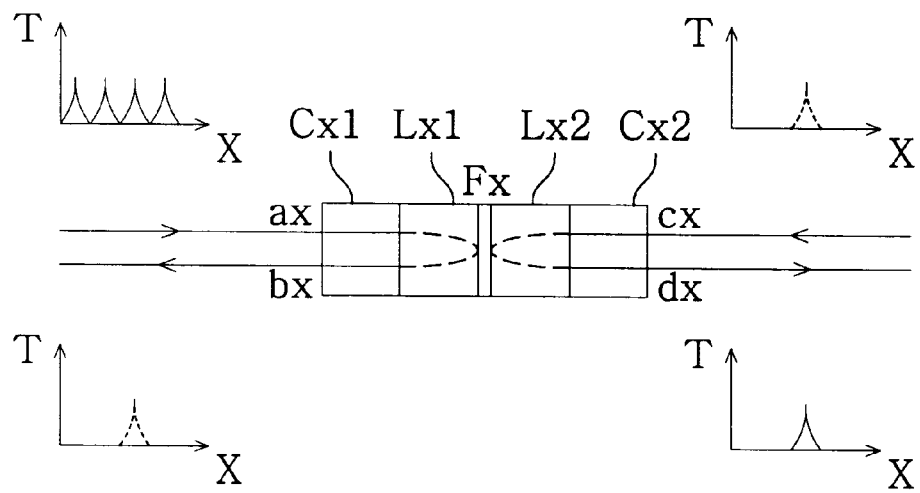
FIGS. 3a and 3b are views showing examples of an optical unit optical device shown in FIG. 2.
Figure 3B:
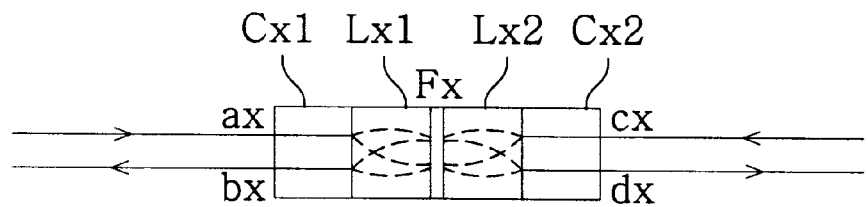

The constitutions of the optical unit devices according to embodiments of the present invention are more specifically shown in FIGS. 3a and 3b.

As shown in FIGS. 3a and 3b, each of the optical unit devices 1 to n comprises a first ferrule $C_{x1}$, a first lens $L_{x1}$, a wavelength division thin film filter $F_x$, a second lens $L_{x2}$, and a second ferrule $C_{x2}$. Herein, the first and second ferrules $C_{x1}$, $C_{x2}$ are dual-core ferrules in which two optical fibers are respectively installed in a state that they are parallel and symmetric with respect to an optical axis and spaced apart therefrom at predetermined distance identical to each other.

More specifically, the optical fibers $a_x$, $b_x$ are installed in parallel within the first ferrule $C_{x1}$; the first lens $L_{x1}$ is aligned and connected to the optical fibers $a_x$, $b_x$; and the second lens $L_{x2}$ and second ferrule $C_{x2}$ is aligned and connected, in a line, to the first lens $L_{x1}$. Further, the wavelength division thin film filter $F_x$ for transmitting only an optical signal having a specific wavelength band and reflecting the optical signals having the other wavelength bands is inserted between the first and second lenses $L_{x1}$, $L_{x2}$. Furthermore, optical fibers $c_x$, $d_x$, installed in parallel within the second ferrule $C_{x2}$, are connected to the second lens $L_{x2}$.

As shown in FIG. 3b, the first lens $L_{x1}$ collimates the optical signal inputted through the optical fiber $a_x$ or $b_x$ into a parallel ray, and outputs it to the wavelength division thin film filter $F_x$. Further, the first lens focuses the optical signal reflected by the wavelength division thin film filter $F_x$, and outputs it to the optical fiber $b_x$ or $a_x$. Furthermore, the first lens $L_{x1}$ focuses an optical signal inputted additionally from the optical fiber $c_x$ and transmitted through the wavelength division thin film filter $F_x$, and outputs it to the optical fiber $b_x$.

Similarly, the second lens $L_{x2}$ collimates the optical signal inputted through the optical fiber $c_x$ or $d_x$ into a parallel ray and outputs it to the wavelength division thin film filter $F_x$. Further, the second lens focuses the optical signal reflected by the wavelength division thin film filter $F_x$ and outputs the optical signal to the optical fiber $d_x$ or $c_x$. Dotted lines in FIG. 3a simply represent transmission and reflection paths of the optical signals outputted from the optical fibers.

Therefore, the optical signal transmitted through the optical fiber $a_x$ is collimated to the parallel ray by the first lens $L_{x1}$ and is inputted to the wavelength division thin film filter $F_x$; and the optical signal transmitted through the wavelength division thin film filter $F_x$ is focused by the second lens $L_{x2}$ and is outputted to the optical fiber $d_x$. Further, the optical signal inputted additionally through the optical fiber $c_x$ is collimated to the parallel ray by the second lens $L_{x2}$ and is inputted to the wavelength division thin film filter $F_x$; and the optical signal transmitted through the wavelength division thin film filter $F_x$ is focused by the first lens $L_{x2}$ and is outputted to the optical fiber $b_x$.

In FIG. 3a, for example, if the wavelength division thin film filter $F_x$ is designed to transmit only an optical signal having a wavelength of $\lambda_3$ and four optical signals having wavelengths different from each other are inputted through the optical fiber $a_x$ of the first ferrule $C_{x1}$, then a plurality of the optical signals $\lambda_1$ to $\lambda_4$ are collimated into the parallel rays by the first lens $L_{x1}$ and inputted to the wavelength division thin film filter $F_x$. And then, the wavelength division thin film filter $F_x$ transmits the only optical signal $\lambda_3$ among the optical signals inputted thereto and outputs the optical signal $\lambda_3$, which in turn is transmitted through the second lens $L_{x2}$ and then through the optical fiber $d_x$ of the second ferrule $C_{x2}$.

On the other hand, the other optical signals $\lambda_1$, $\lambda_2$ and $\lambda_4$ excluding the optical signal $\lambda_3$ are reflected by the wavelength division thin film filter $F_x$, and then they are again transmitted through the first lens $L_{x1}$ in a reverse direction. Accordingly, the first lens $L_{x1}$ focuses the optical signals $\lambda_1$, $\lambda_2$ and $\lambda_4$ reflected by the wavelength division thin film filter $F_x$ and then outputs them to the optical fiber $b_x$ of the first ferrule $C_{x1}$.

Consequently, as shown in FIG. 3a, the optical signals $\lambda_1$, $\lambda_2$ and $\lambda_4$ can be transmitted through the optical fiber $b_x$ whereas only the optical signal $\lambda_3$ can be transmitted through the optical fiber $d_x$.

At this time, if the optical signal $\lambda_3$ is added through the optical fiber $c_x$ of the second ferrule $C_{x2}$, then the optical signal $\lambda_3$ is collimated through the second lens $L_{x2}$ to the parallel ray and then inputted through the wavelength division thin film filter $F_x$ to the first lens $L_{x1}$. Next, the optical signal $\lambda_3$ is focused by the first lens $L_{x1}$ and outputted to the optical fiber $b_x$. Consequently, the optical signal $\lambda_3$ added from the optical fiber $c_x$ is outputted, together with the optical signals $\lambda_1$, $\lambda_2$ and $\lambda_4$, to the optical fiber $b_x$.

As described in the foregoing, the optical signal multiplexing and demultiplexing portion comprising the n optical unit devices according to the embodiment of the present invention can perform both a function of separating a plurality of the optical signals having different wavelengths into respective optical signals and of transmitting the respectively separated signals and a function of combining the respective optical signals with each other and of transmitting the combined signals.

The switch module 200 which is connected to the optical signal multiplexing and demultiplexing portion 100 including the optical unit devices 1 to n constructed as such in order to drop and add an optical signal having a specific wavelength comprises n 2×2 switches $SW_1$ to $SW_n$ that are selectively connected to add and drop channels $A_x$, $D_x$ of the local network or metro access network (not shown).

Figure 4A:
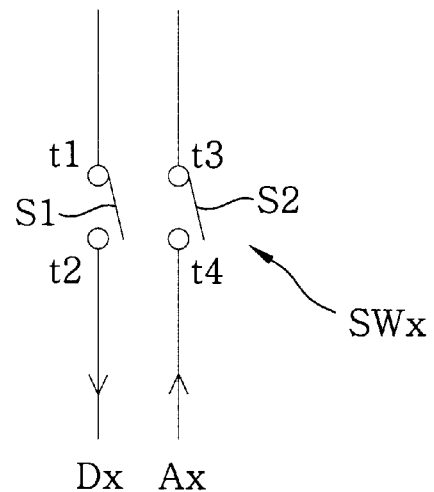
FIGS. 4a and 4b are view showing a switch module of FIG. 2.
Figure 4B:
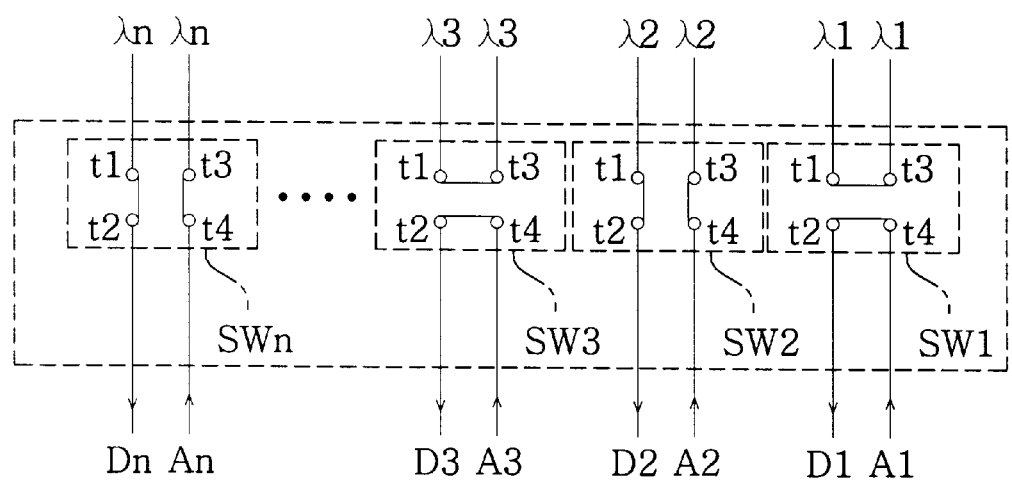

FIG. 4a shows the detailed constitution of the 2×2 switch, and FIG. 4b shows a connection state of the 2×2 switches.

As shown in FIG. 4a, the 2×2 switch comprises a switch $S_1$ for connecting a terminal $t_1$ of the optical fiber, connected to the optical signal multiplexing and demultiplexing portion 100, with either a terminal $t_2$ of the drop channel $D_x$ connected to the local network or a terminal $t_3$ of the optical fiber connected to the optical signal multiplexing and demultiplexing portion 100; and a switch $S_2$ for connecting a terminal $t_4$ of the add channel $A_x$, connected to the local network, with either the terminal $t_2$ of the drop channel $D_x$ or the terminal $t_3$ of the optical fiber connected to the optical signal multiplexing and demultiplexing portion 100.

Like the 2×2 switch $SW_1$ of the switch module 200 shown in FIG. 4b, if a terminal $t_1$ of the optical fiber connected to the optical signal multiplexing and demultiplexing portion 100 and a terminal $t_4$ of an add channel $A_1$ connected to the local network are connected, respectively, to a terminal $t_3$ of the optical fiber connected to the optical signal multiplexing and demultiplexing portion 100 and a terminal $t_2$ of an drop channel $D_1$, then an optical signal $\lambda_1$ transmitted through the optical fiber from the optical signal multiplexing and demultiplexing portion 100 is not transmitted to the local network but is again inputted to the optical signal multiplexing and demultiplexing portion 100.

On the other hand, like the 2×2 switch $SW_2$ of the switch module 200 shown in FIG. 4b, if a terminal $t_1$ of the optical fiber connected to the optical signal multiplexing and demultiplexing portion 100 and a terminal $t_4$ of an add channel $A_2$ are connected, respectively, to a terminal $t_2$ of an drop channel $D_2$ connected to the local network and a terminal $t_3$ of the optical fiber connected to the optical signal multiplexing and demultiplexing portion 100, then an optical signal $\lambda_2$ transmitted through the optical fiber from the optical signal multiplexing and demultiplexing portion 100 is transmitted through the drop channel $D_2$ to the local network, and another optical signal $\lambda_2$ added through the add channel $A_2$ of the local network is inputted through the optical fiber to the optical signal multiplexing and demultiplexing portion 100. Thus, the optical signal add/drop apparatus according to the embodiment of the present invention can simultaneously add and drop a plurality of the optical signals by means of switching process of the 2×2 switches.

Hereinafter, for the sake of clarity, a connection state of the 2×2 switch $SW_1$, where the terminals $t_1$ and $t_4$ are connected to the terminals $t_3$ and $t_2$ respectively, is referred to as "transmission-connected state," whereas a connection state of the 2×2 switch $SW_2$, where the terminals $t_1$ and $t_4$ are connected to the terminals $t_2$ and $t_3$ respectively, is referred to as "add/drop-connected state."

In the embodiment of the present invention, the optical signal multiplexing and demultiplexing portion 100 is embodied as a plurality of optical unit devices 1 to n constructed as such; the 2×2 switches $SW_1$ to $SW_2$ of the switch module 200 are correspondingly connected to the optical unit devices 1 to n, respectively; a plurality of the optical signals having wavelengths different from each other are separated into individual signals having respective wavelength bands or the optical signals to be inputted are combined with other optical signals having different wavelengths; and the combined or separated optical signals are transmitted. Consequently, bi-directional transmission of the optical signals can be made.

On the other hand, among the optical unit devices 1 to n of the optical signal multiplexing and demultiplexing portion 100, optical fibers $b_1$ to $b_n$ of other optical unit devices 1 to n−1 excluding n-th optical unit devices are connected to optical fibers $a_2$ to $a_n$ of the next optical unit devices 2 to n, respectively. That is, the optical fiber $b_x$ of the x-th optical unit device x (x=1, 2, ..., n) is connected to the optical fiber $a_{x+1}$ of the (x+1)-th optical unit device x+1, and the optical signal outputted to the optical fiber $b_x$ of the x-th optical unit device x is consequently inputted to the optical fiber $a_{x+1}$ of the (x+1)-th optical unit device x+1. Herein, a wavelength division thin film filter $F_x$ of the x-th optical unit device x is constructed to transmit the only optical signal corresponding to the wavelength of $\lambda_x$ and to reflect the other optical signals.

Next, the operation of the optical signal add/drop apparatus according to the embodiment of the present invention will be described, based on the constitution mentioned above.

When a plurality of the optical signals $\lambda_1$ to $\lambda_n$, which have wavelengths different from each other and are inputted through the input channel, are to be transmitted to the output channel, respective 2×2 switches $SW_1$ to $SW_n$ of the switch module 200 are set to become a transmission-connected state as shown in FIG. 2.

In such a case, n optical signals $\lambda_1$ to $\lambda_n$, which have wavelengths different from each other and are inputted through the input channel, are collimated through the first lens $L_{11}$ of the first optical unit device 1 to parallel rays and then are inputted to the wavelength division thin film filter $F_1$, through which the only optical signal $\lambda_1$ is, in turn, transmitted and is outputted to the optical fiber $d_1$ through the second lens $L_{12}$. At this time, since the terminal $t_1$ of the 2×2 switch $SW_1$ connected to the optical fiber $d_1$ is connected to the terminal $t_3$ connected to the optical fiber $c_1$, the optical signal $\lambda_1$ is again inputted through the 2×2 switch $SW_1$ to the optical fiber $c_1$ of the first optical unit device 1, is collimated into the parallel ray by the second lens $L_{12}$, and is outputted to the wavelength division thin film filter $F_1$. Thereafter, the optical signal $\lambda_1$ is transmitted through the wavelength division thin film filter $F_1$, and then it is outputted to the optical fiber $b_1$ through the first lens $L_{11}$ and is inputted to the optical fiber $a_2$ of the second optical unit device 2.

However, the optical signal $\lambda_1$ inputted to the optical fiber $a_2$ of the second optical unit device 2 is reflected by the wavelength division thin film filter $F_2$, and then it is inputted to the optical fiber $a_3$ of the third optical unit device 3 through the first lens $L_{21}$ and the optical fiber $b_2$.

Accordingly, the optical signal $\lambda_1$ is separated from the other optical signals $\lambda_2$ to $\lambda_n$ by the first optical unit device 1, and then it is continuously reflected by the other optical unit devices 2 to n and is transmitted to the output channel.

On the other hand, the other optical signals $\lambda_2$ to $\lambda_n$ reflected by the wavelength division thin film filter $F_1$ of the first optical unit device 1 are outputted to the optical fiber $b_1$ through the first lens $L_{11}$ and inputted to the optical fiber $a_2$ of the next optical unit device, i.e., the second optical unit device 2. Thereafter, only the optical signal $\lambda_2$ is transmitted through the wavelength division thin film filter $F_2$ of the second optical unit device 2, and is transmitted to the 2×2 switch $SW_2$ through the second lens $L_{22}$ and the optical fiber $d_2$. And then, the optical signal is again inputted to the third optical unit device 2 through the second lens $L_{22}$, the wavelength division thin film filter $F_2$, the first lens $L_{21}$, and the optical fiber $b_2$. Consequently, the optical signal $\lambda_2$ is also outputted to the output channel through the other optical unit devices 3 to n, similar to the optical signal $\lambda_1$ described in the foregoing.

Accordingly, a plurality of the optical signals $\lambda_1$ to $\lambda_n$ having wavelengths different from each other are separated by the optical unit devices 1 to n, respectively; but they are again combined by the 2×2 switches $SW_1$ to $SW_n$ of the switch module 200, and then are transmitted to the output channel.

On the contrary, in such a case that some optical signals added from the optical signals $\lambda_1$ to $\lambda_n$ inputted from the input channel are to be transmitted to the local network or that the optical signals having specific wavelengths added from the local network are to be transmitted to the output channel, the 2×2 switches connected to optical unit devices for transmitting only the optical signals having the relevant wavelengths are set to be the add/drop-connected state.

Figure 5:
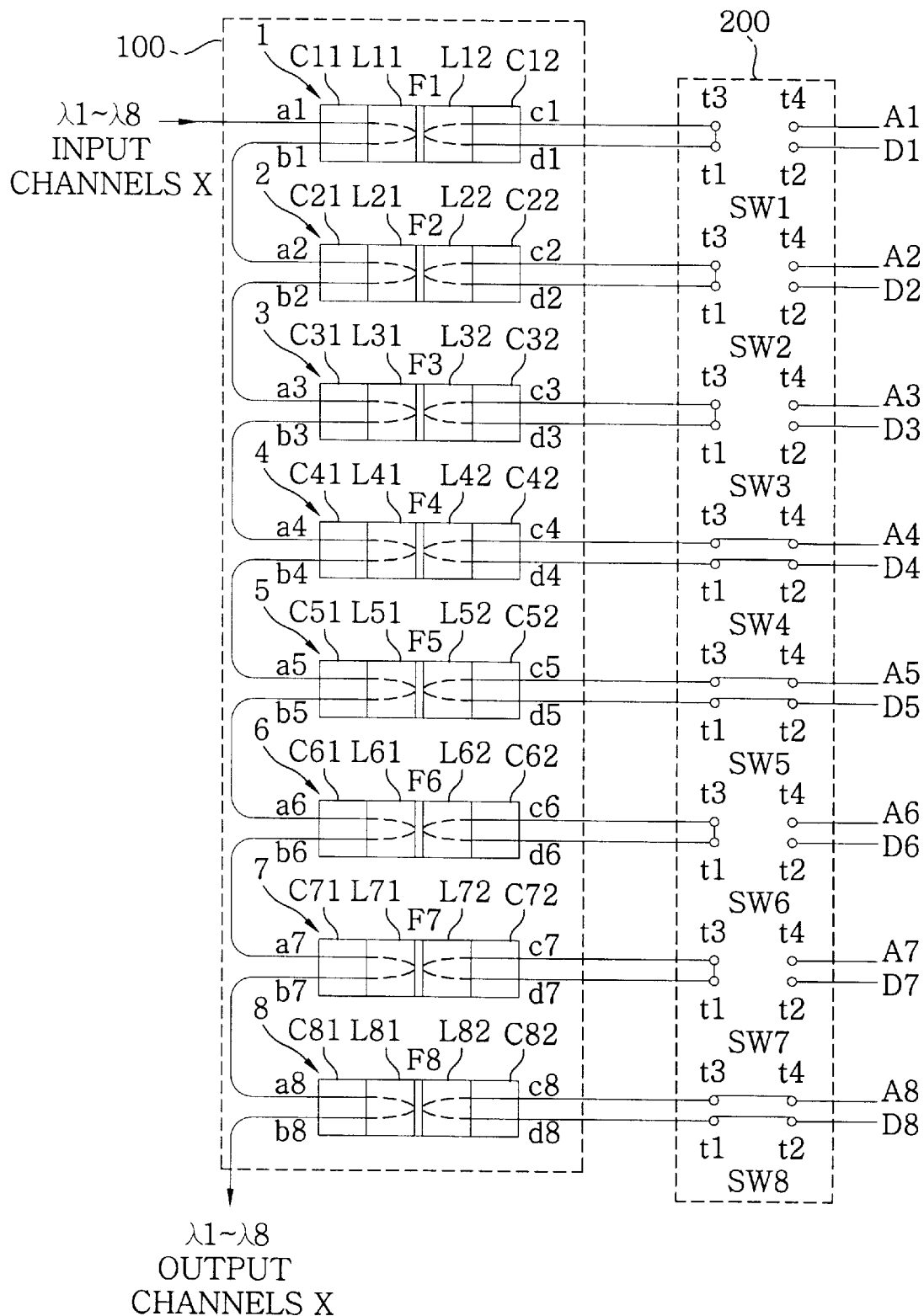
FIG. 5 is a view showing a connection state of a 2×2 switch when an optical signal having a specific wavelength is added or dropped in accordance with an embodiment of the present invention.

FIG. 5 shows a connection state of the 2×2 switches in which the optical signals having specific wavelengths are added or dropped.

As shown in FIG. 5, for example, if the optical signals $\lambda_1$ to $\lambda_8$ having eight wavelength bands different from each other are transmitted from the input channel to the output channel and if the optical signals $\lambda_4$, $\lambda_5$, $\lambda_8$ are simultaneously dropped and added from the local network, the terminal $t_1$ of the 2×2 switch $SW_4$, connected to the fourth optical unit device 4 for dropping the optical signal $\lambda_4$, is connected to the terminal $t_2$ and the terminal $t_4$ of the add channel $A_4$ is connected to the terminal $t_3$ connected to the fourth optical unit device 4, thereby making the 2×2 switch $SW_4$ be set to become the add/drop-connected state. Likewise, the 2×2 switches $SW_5$, $SW_8$ connected to the fifth and eighth optical unit devices 5, 8 for adding and dropping the optical signals $\lambda_5$, $\lambda_8$, respectively, are also set to become the add/drop-connected state.

Therefore, the 2×2 switches connected to the optical unit devices for transmitting the optical signals having specific wavelengths, which intend to be dropped and added from the local network, are set to become the add/drop-connected state, and then the optical signals $\lambda_1$ to $\lambda_8$ are successively transmitted via the optical unit devices 1 to 8 as described above.

The optical signal $\lambda_4$, which intends to be dropped from the optical signals, is consecutively reflected by the wavelength division thin film filters $F_1$ to $F_3$ of the first to third optical unit devices 1 to 3, and then it is inputted to the fourth optical unit device 4. Thereafter, the optical signal $\lambda_4$ is separated from the other optical signals by means of the wavelength division thin film filter $F_4$ of the fourth optical unit device 4, and then it is dropped through the second lens $L_{42}$, the optical fiber $d_4$, the 2×2 switch $SW_4$ and the drop channel $D_4$ and transmitted to the local network.

On the other hand, the optical signal $\lambda_4$ inputted from an add channel $A_4$ of the local network is inputted to the fourth optical unit device 4 via the 2×2 switch $SW_4$, and then it is inputted to the fifth optical unit device 5 via the second lens $L_{42}$, the wavelength division thin film filter $F_4$, the first lens $F_{41}$ and the optical fiber $b_4$ of the fourth optical unit device 4. Thereafter, the optical signal $\lambda_4$ is continuously reflected by the fifth to eighth optical unit devices 5 to 8, and is simultaneously combined with the other optical signals having different wavelengths and transmitted to the output channel.

In addition, the optical signal $\lambda_5$ is separated from the other optical signals by the fifth optical unit device 5, and then it is dropped by the 2×2 switch $SW_5$ and transmitted to the local network. Further, an add optical signal $\lambda_5$, inputted through an add channel $A_5$ to the local network, is inputted to the fifth optical unit device 5 through the 2×2 switch $SW_5$, and then it is combined with the other optical signals and transmitted to the output channel after it is continuously reflected by the sixth to eighth optical unit devices 6 to 8.

Furthermore, the optical signal $\lambda_8$ is dropped by the eighth optical unit device 8 and the 2×2 switch $SW_8$ and dropped to the local network. The optical signal $\lambda_8$, inputted through an add channel $A_8$ to the local network, is also inputted to the eighth optical unit device 8 by the 2×2 switch $SW_8$, and then it is combined with the other optical signals having different wavelengths and transmitted to the output channel.

Therefore, although the optical signals $\lambda_4$, $\lambda_5$ and $\lambda_8$ inputted through the input channel are dropped to the local network, all the optical signals $\lambda_1$ to $\lambda_8$ can be outputted to the output channel because the new optical signals $\lambda_4$, $\lambda_5$ and $\lambda_8$ are added from the local network.

According to the embodiment of the present invention, since the only n optical unit devices can perform all the functions of the conventional multiplexer and demultiplexer, the number, i.e., 2n, of the optical devices used in the prior art can be reduced by 50%. Accordingly, an advantage is obtained in that the small and light add/drop apparatus of the present invention can be made.

As described in the above, the optical signal add/drop apparatus for simultaneously adding and dropping a plurality of optical signals having different wavelengths according to the present invention can be manufactured with low costs and in a small size.

The present invention is not limited to the above embodiments, but the other various modifications or changes can be also made thereto.

What is claimed is:

1. An optical signal add and drop apparatus, comprising:
   a first dual-core ferrule having first and second optical fibers for transmitting at least one optical signal, said optical fibers being disposed to be symmetrical to each other at identical distances from an optical axis;
   a second dual-core ferrule having third and fourth optical fibers for transmitting at least one optical signal, said optical fibers being disposed to be symmetrical to each other at identical distances from said optical axis;
   a wavelength division thin film filter for selectively transmitting only an optical signal having a specific wavelength;
   a first lens for collimating said optical signal inputted thereto from one of said optical fibers of said first dual-core ferrule into a parallel ray and outputting said parallel ray to said wavelength division thin film filter, and for focusing said optical signal inputted thereto from said wavelength division thin film filter and outputting said optical signal to the other optical fiber of said first dual-core ferrule; and
   a second lens for focusing said optical signal inputted thereto from said wavelength division thin film filter and outputting said optical signal to one of said optical fibers of said second dual-core ferrule, and for collimating said optical signal inputted thereto from the other optical fiber of said second dual-core ferrule into a parallel ray and outputting said parallel ray to said wavelength division thin film filter; wherein
      said first lens, said wavelength division thin film filter, and said second lens are arranged on said optical axis;
   the first lens collimates the optical signal inputted through the first optical fiber into a parallel ray and outputs it to said wavelength division thin film filter, and also focuses the optical signal, which is reflected by or passes through said wavelength division thin film filter, and outputs optical signal to be reflected to the second optical fiber or transmitted optical signal to fourth optical fiber through second lens, respectively; and
   the second lens collimates the optical signal inputted through the third optical fiber into a parallel ray and outputs it to said wavelength division thin film filter, and transmitted optical signal to second optical fiber through first lens, and also focuses the optical signal transmitted thereto from said wavelength division thin film filter through first lens and outputs it to the fourth optical fiber.

2. An optical signal add and drop apparatus, comprising:
   a first dual-core ferrule having first and second optical fibers for transmitting at least one optical signal, said optical fibers being disposed to be symmetrical to each other at identical distances from an optical axis;
   a second dual-core ferrule having third and fourth optical fibers for transmitting at least one optical signal, said optical fibers being disposed to be symmetrical to each other at identical distances from said optical axis;
   a wavelength division thin film filter for selectively transmitting only an optical signal having a specific wavelength;
   a first lens for collimating said optical signal inputted thereto from one of said optical fibers of said first dual-core ferrule into a parallel ray and outputting said parallel ray to said wavelength division thin film filter, and for focusing said optical signal inputted thereto from said wavelength division thin film filter and outputting said optical signal to the other optical fiber of said first dual-core ferrule; and
   a second lens for focusing said optical signal inputted thereto from said wavelength division thin film filter and outputting said optical signal to one of said optical fibers of said second dual-core ferrule, and for collimating said optical signal inputted thereto from the other optical fiber of said second dual-core ferrule into a parallel ray and outputting said parallel ray to said wavelength division thin film filter; wherein
      said first lens, said wavelength division thin film filter, and said second lens are arranged on said optical axis; and
      the third optical fiber is an add channel to which new optical signal is added from the local network, and the fourth optical fiber is an drop channel through which the optical signal is dropped to the local network.

3. An optical signal add and drop apparatus, comprising:
   an optical signal multiplexing and demultiplexing portion including a plurality of optical unit devices which comprises a first dual-core ferrule having first and second optical fibers for transmitting at least one optical signals, said optical fibers being disposed to be symmetrical to each other at identical distances from an optical axis, a second dual-core ferrule having third and fourth optical fibers for transmitting at least one optical signals, said optical fibers being disposed to be symmetrical to each other at identical distances from said optical axis, a wavelength division thin film filter for selectively transmitting only an optical signal having a specific wavelength, a first lens for collimating said optical signal inputted thereto from one of said optical fibers of said first dual-core ferrule into a parallel ray and outputting said parallel ray to a first surface of said wavelength division thin film filter, and for focusing said optical signal inputted thereto from said wavelength division thin film filter and outputting said optical signal to the other optical fiber of said first dual-core ferrule, and a second lens for focusing said optical signal inputted thereto from said wavelength division thin film filter and outputting said optical signal to one of said optical fibers of said second dual-core ferrule, and for collimating said optical signal inputted thereto from the other optical fiber of said second dual-core ferrule into a parallel ray and outputting said parallel ray said wavelength division thin film filter; and a switch module having a plurality of switches connected correspondingly to the optical unit devices, respectively, for dropping the optical signal outputted from the optical devices or adding the optical signal, identical to that dropped from the optical devices, to the optical devices;

wherein said switches are connected to third and fourth optical fibers of said optical unit devices, thereby being constructed in the form of the 2×2 switches for dropping the optical signals outputted from said optical unit devices or adding the optical signals identical to the dropped optical signals.

4. An optical signal add and drop apparatus, comprising:

an optical signal multiplexing and demultiplexing portion including a plurality of optical unit devices which comprises a first dual-core ferrule having first and second optical fibers for transmitting at least one optical signals, said optical fibers being disposed to be symmetrical to each other at identical distances from an optical axis, a second dual-core ferrule having third and fourth optical fibers for transmitting at least one optical signals, said optical fibers being disposed to be symmetrical to each other at identical distances from said optical axis, a wavelength division thin film filter for selectively transmitting only an optical signal having a specific wavelength, a first lens for collimating said optical signal inputted thereto from one of said optical fibers of said first dual-core ferrule into a parallel ray and outputting said parallel ray to a first surface of said wavelength division thin film filter, and for focusing said optical signal inputted thereto from said wavelength division thin film filter and outputting said optical signal to the other optical fiber of said first dual-core ferrule, and a second lens for focusing said optical signal inputted thereto from said wavelength division thin film filter and outputting said optical signal to one of said optical fibers of said second dual-core ferrule, and for collimating said optical signal inputted thereto from the other optical fiber of said second dual-core ferrule into a parallel ray and outputting said parallel ray said wavelength division thin film filter; and a switch module having a plurality of switches connected correspondingly to the optical unit devices, respectively, for dropping the optical signal outputted from the optical devices or adding the optical signal, identical to that dropped from the optical devices, to the optical devices; wherein the first lens collimates the optical signal inputted through the first optical fiber into a parallel ray and outputs it to said wavelength division thin film filter, and also focuses the optical signal, which is reflected by or passes through said wavelength division thin film filter, and outputs it to the second optical fiber; and the second lens collimates the optical signal inputted through the third optical fiber into a parallel ray and outputs it to said wavelength division thin film filter, and also focuses the optical signal inputted thereto from said wavelength division thin film filter and outputs it to the fourth optical fiber.

5. An optical signal add and drop apparatus, comprising:

an optical signal multiplexing and demultiplexing portion including a plurality of optical unit devices which comprises a first dual-core ferrule having first and second optical fibers for transmitting at least one optical signals, said optical fibers being disposed to be symmetrical to each other at identical distances from an optical axis, a second dual-core ferrule having third and fourth optical fibers for transmitting at least one optical signals, said optical fibers being disposed to be symmetrical to each other at identical distances from said optical axis, a wavelength division thin film filter for selectively transmitting only an optical signal having a specific wavelength, a first lens for collimating said optical signal inputted thereto from one of said optical fibers of said first dual-core ferrule into a parallel ray and outputting said parallel ray to a first surface of said wavelength division thin film filter, and for focusing said optical signal inputted thereto from said wavelength division thin film filter and outputting said optical signal to the other optical fiber of said first dual-core ferrule, and a second lens for focusing said optical signal inputted thereto from said wavelength division thin film filter and outputting said optical signal to one of said optical fibers of said second dual-core ferrule, and for collimating said optical signal inputted thereto from the other optical fiber of said second dual-core ferrule into a parallel ray and outputting said parallel ray said wavelength division thin film filter; and a switch module having a plurality of switches connected correspondingly to the optical unit devices, respectively, for dropping the optical signal outputted from the optical devices or adding the optical signal, identical to that dropped from the optical devices, to the optical devices;

wherein the third optical fiber is an add channel to which new optical signal is added from the local network, and the fourth optical fiber is a drop channel through which the optical signal is dropped to the local network.

* * * * *